US008104365B2

(12) United States Patent
Heichel et al.

(10) Patent No.: US 8,104,365 B2

(45) **Date of Patent: *Jan. 31, 2012**

(54) VIBRATION GENERATOR

(75) Inventors: Christian Heichel, Niedernberg (DE); Albrecht Kleibl, Schaafsheim (DE)

(73) Assignee: ABI Anlagentechnik-Baumaschinen-Industriebedarf Maschinenfabrik und Vertriebsgesellschaft mbH, Niedernberg (DE)

( * ) Notice: Subject to any disclaimer, the term of this patent is extended or adjusted under 35 U.S.C. 154(b) by 238 days.

This patent is subject to a terminal disclaimer.

(21) Appl. No.: 12/381,343

(22) Filed: Mar. 11, 2009

(65) Prior Publication Data

US 2009/0241704 A1 Oct. 1, 2009

(30) Foreign Application Priority Data

Mar. 28, 2008 (EP) .................................... 08103162

(51) Int. Cl.
*F16H 33/00* (2006.01)

(52) U.S. Cl. ........................................................... 74/61

(58) Field of Classification Search ................ 74/61, 86, 74/87; 310/81; 209/367; 601/46, 67
See application file for complete search history.

(56) References Cited

U.S. PATENT DOCUMENTS 5,177,386 A * 1/1993 Shimada ......................... 310/81
5,410,879 A * 5/1995 Houze ............................. 60/469
6,604,583 B1 * 8/2003 Van Randen ..................... 173/49
7,598,640 B2 * 10/2009 Heichel et al. .................. 310/81
7,804,211 B2 * 9/2010 Kleibl et al. ..................... 310/81
2008/0218013 A1 * 9/2008 Heichel et al. .................. 310/81
2008/0219085 A1 * 9/2008 Heichel et al. ................ 366/128

FOREIGN PATENT DOCUMENTS

| | | |
|---|---|---|
| DE | 1 458 580 | 9/1969 |
| DE | 39 01 156 | 8/1989 |
| DE | 196 39 789 | 4/1998 |
| DE | 20 2006 004 706 | 6/2006 |
| DE | 20 2007 003 532 | 8/2007 |
| DE | 20 2007 005 283 | 8/2007 |
| FR | 1 093 952 | 5/1955 |

OTHER PUBLICATIONS

European Search Report with English translation of same.

* cited by examiner

*Primary Examiner* — Vicky Johnson

(74) *Attorney, Agent, or Firm* — Collard & Roe, P.C.

(57) ABSTRACT

A vibration generator has two groups of shafts, on which at least two groups of imbalances are disposed, and which are connected with at least one drive, by means of which they are put into rotation. The shaft groups are connected with the at least one drive in such a manner that the speed of rotation of one shaft group amounts to half the speed of rotation of the other shaft group, and the ratio of the static moments of the shaft groups provided with the imbalance groups amounts to between six to one and ten to one.

1 Claim, 10 Drawing Sheets a)

b)

c)

VIBRATION GENERATOR

CROSS REFERENCE TO RELATED APPLICATIONS

Applicants claim priority under 35 U.S.C. §119 of European Application No. 08103162.7 filed Mar. 28, 2008.

BACKGROUND OF THE INVENTION

1. Field of the Invention

The invention relates to a vibration generator comprising two, three, or four groups of shafts, on which at least two groups of imbalances are disposed. The shafts are connected with at least one drive, which rotates the shafts at different speeds of rotation.

2. The Prior Art

In construction, vibration generators are used to introduce objects, such as profiles, into the ground, or to draw them from the ground, or also to compact ground material. The ground is excited by vibration, and thereby achieves a "pseudo-fluid" state. The goods to be driven in can then be pressed into the construction ground by a static top load. The vibration is characterized by a linear movement and is generated by rotating imbalances that run in opposite directions, in pairs.

Vibration generators are vibration exciters having a linear effect, whose centrifugal force is generated by rotating imbalances. These vibration exciters move at a changeable speed. The size of the imbalance is also referred to as static moment. The progression of the speed of the linear vibration exciter corresponds to a periodically recurring function, particularly a sine function. On the basis of the sine-shaped progression of the force effect generated by the rotating imbalance masses, a drive that acts alternately in the forward drive direction and counter to it, with time offset, is produced. This effect is determined, in the final analysis, by static forces, particularly the inherent weight and static top loads. Without the superimposition of static forces on the vibration, the material being driven would not move forward, but rather simply vibrate back and forth. It is a disadvantage of the previously known systems that the pile-driving process, with the aforementioned sine-shaped force progression, demonstrates significant energy consumption, which is additionally increased due to friction of the material being driven, in the ground. The energy expended for the vibration generator brings about almost no forward drive.

SUMMARY OF THE INVENTION

It is therefore an object of the invention to provide a vibration generator that allows a directed effect of the force in the forward drive direction.

According to the invention, this object is accomplished by a vibration generator that allows a directed effect of force in the forward drive direction. By coupling at least two shaft groups having a speed of rotation ratio of 2:1 and a ratio of the static moment of between 6:1 and 10:1, a directed characteristic line in the forward drive direction is produced by superimposition of the sine-shaped force characteristic lines generated by the rotating imbalances. A significantly greater maximal force in the forward drive direction comes about, in comparison with the opposite direction. Since the ground cannot follow the great acceleration in the pile-driving direction during the pile-driving process, the goods to be driven in uncouple from the ground, which is also vibrating, at every forward drive pulse. Because of this periodic uncoupling of ground and goods to be driven in, little energy is transferred to the construction ground. As a result, the vibration stress on the surroundings is also clearly reduced.

Preferably, the static moment of the first shaft group is eight times as great as the static moment of the second shaft group. In this way, a marked force peak in the forward drive direction is brought about.

In another embodiment, the maximal effective force is increased by another marked force peak in the forward drive direction by the use of three shaft groups on which at least three imbalance groups are disposed, whereby the shaft groups demonstrate a speed of rotation ratio of 1:2:3, and the ratio of the shaft groups, relative to one another, amounts to essentially 100:16.64:3.68. In this way, a further increase in energy efficiency, connected with acceleration of the pile-driving process, is brought about.

In a further embodiment, additional particular emphasis of the force progression in the forward drive direction is achieved by the use of four shaft groups, on which at least four imbalance groups are disposed, whereby the speed of rotation ratio of the shaft groups, relative to one another, amounts to 1:2:3:4, and the ratio of the static moments of the shaft groups, relative to one another, amounts to essentially 100:18.72:5.6:1.38.

In a further development of the invention, the direction of the effect of the vibration generator can be adjusted. In this way, adaptation of the vibration generator to different process requirements, such as pile-driving and retraction, is made possible.

The means for adjustment of the effect direction can comprise a swivel motor by way of which the phase position, relative to one another, of at least two imbalance groups that rotate at different speeds of rotation can be changed. In this way, a change in the effect direction is made possible, without any conversion measures being required.

In a further embodiment of the invention, the at least two imbalance groups are connected with the swivel motor by way of gear wheels, and at least one imbalance group is connected with the stator, and at least one imbalance group is connected with the rotor of the swivel motor. In this way, direct adjustment of the imbalance groups by way of the swivel motor is made possible.

It is advantageous if the swivel motor is a rotary vane swivel motor that has one vane. As compared with swivel motors that are adjustable over 180 degrees, this motor has a torque that is many times greater and has lower friction. Alternatively, the swivel motor can also be a swivel motor having a steep thread.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

Figure 5:
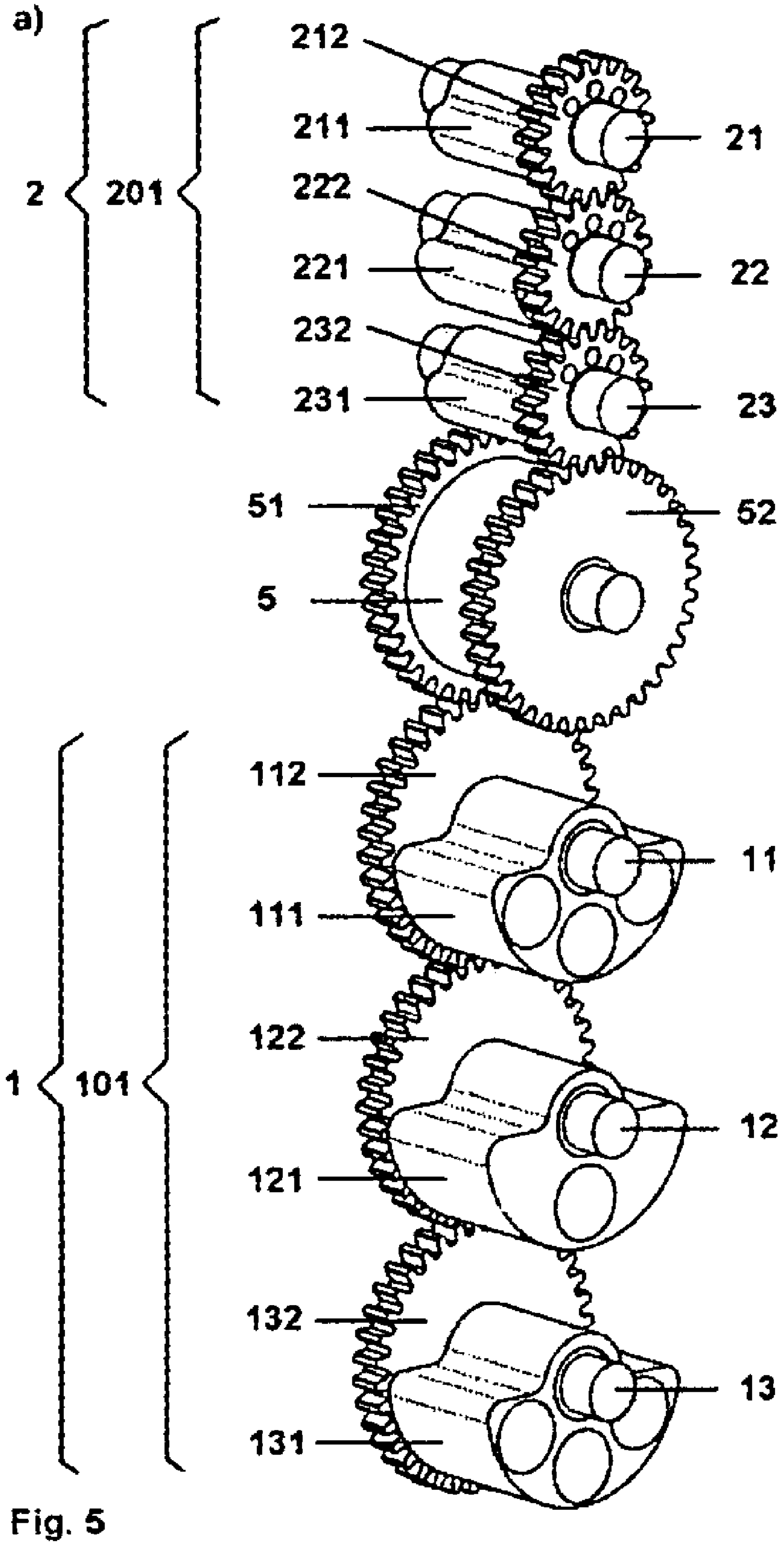
Figure 5:
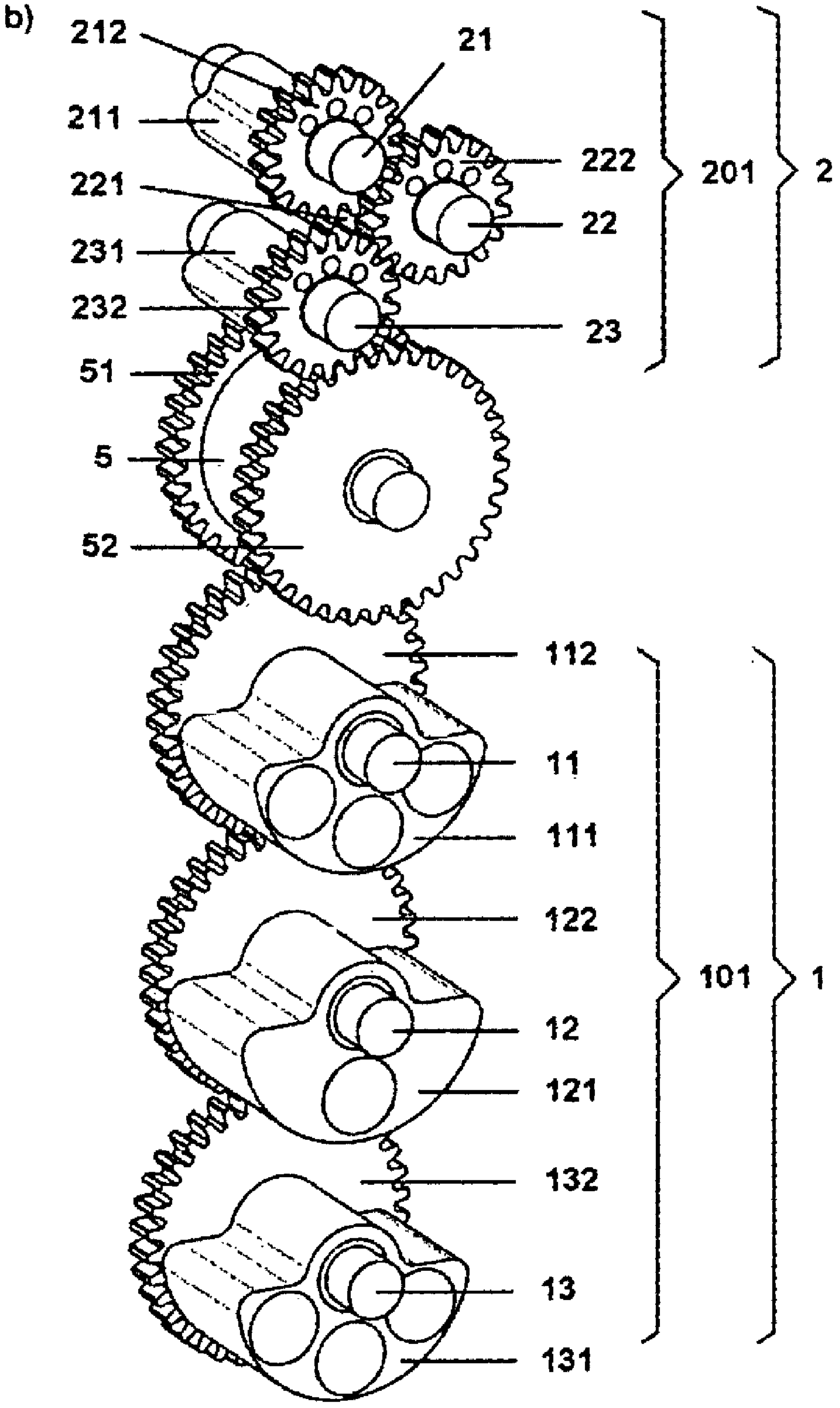
Figure 6:
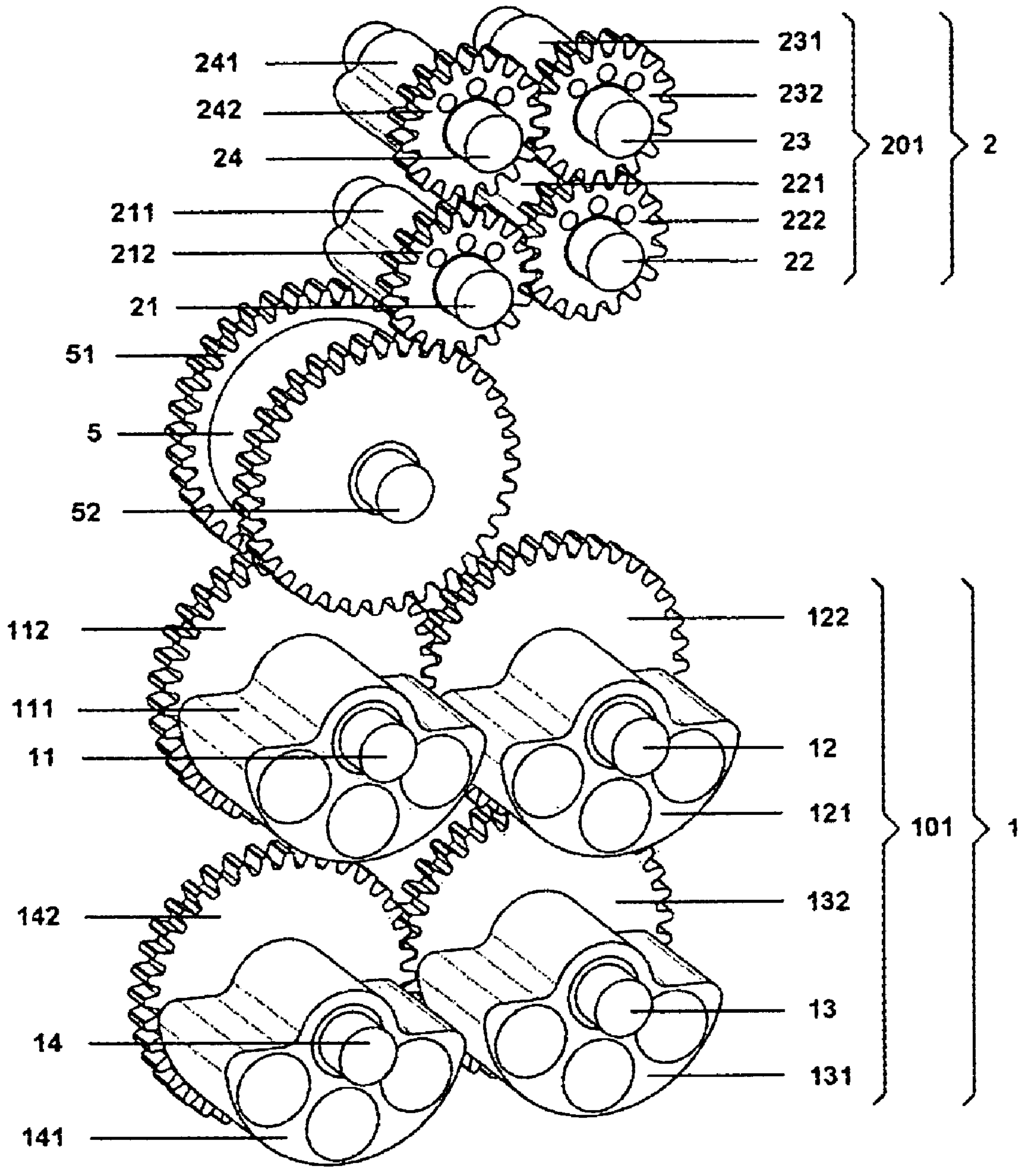
Figure 7:
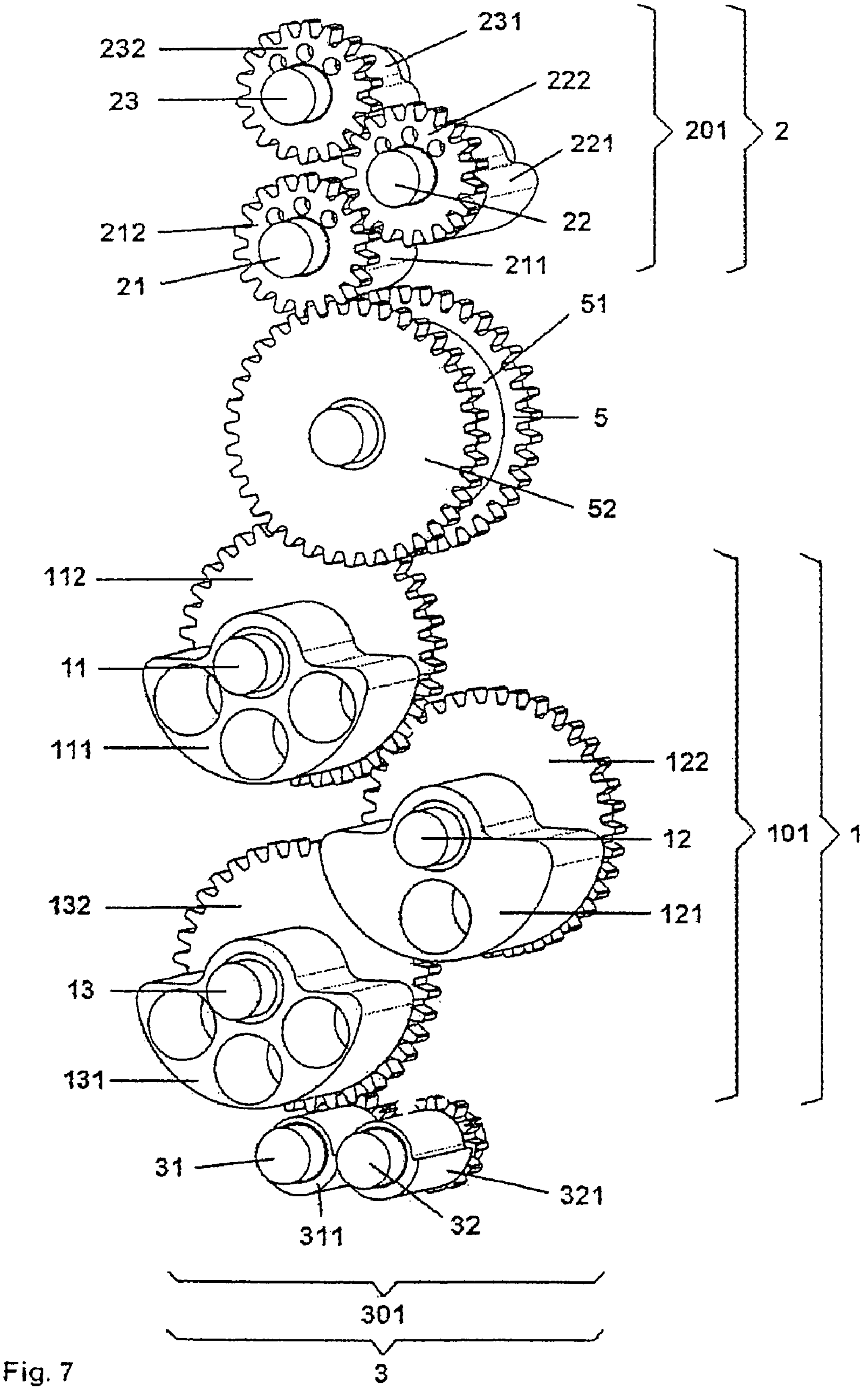

b) a seven-shaft, simple construction; and c) a seven-shaft, short construction;

FIG. 5 is a schematic representation of vibrator gear mechanisms that act in a directed manner and can change direction, having a) a six-shaft, simple construction; and b) a six-shaft, short construction;

FIG. 6 is a representation of the vibrator gear mechanism from FIG. 5, in a compact embodiment; and FIG. 7 is a schematic representation of a vibrator gear mechanism that can change direction, having eight shafts.

DETAILED DESCRIPTION OF THE PREFERRED EMBODIMENT

Referring now in detail to the drawings, the vibration generators selected as exemplary embodiments are configured as vibrator gear mechanisms. Such vibrators consist essentially of a housing, in which shafts provided with gear wheels are mounted. The gear wheels are each provided with imbalance masses. Such vibrator gear mechanisms having imbalance masses mounted to rotate are known to a person skilled in the art, for example from DE 20 2007 005 283 U1. The following explanation of the exemplary embodiments is essentially limited to the arrangement of shafts and imbalance masses.

Figure 1:
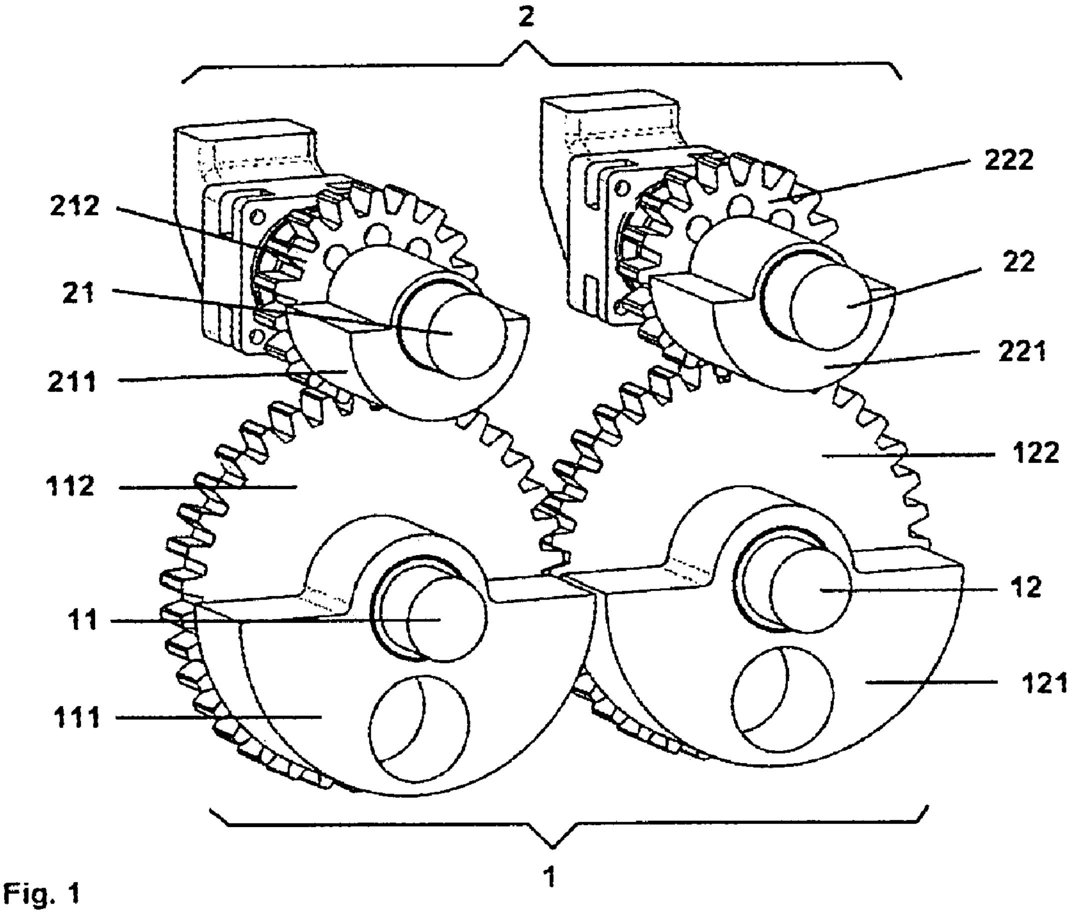
FIG. 1 is a schematic representation of a gear mechanism of a vibration generator for directed vibration, having two shaft groups.

In the embodiment according to FIG. 1, two shaft groups 1, 2 are disposed. Shafts 11, 12 of shaft group 1 are provided with gear wheels 112, 122, on which imbalance masses 111, 121, are disposed. Imbalance masses 111, 121 are configured in the same manner in the exemplary embodiment. Shafts 21, 22 of shaft group 2 are also provided with gear wheels 212, 222, on which imbalance masses 211, 221 of the same type are disposed. Gear wheels 112, 122, 212, 222 are configured in such a manner that during rotation, the speed of rotation of shafts 21, 22 of shaft group 2 is twice as great as the speed of rotation of shafts 11, 12. The imbalance masses 111, 121, 211, 221 are disposed in such a manner that the static moment of shaft group 1 is eight times as great as the static moment of shaft group 2.

Figure 2:
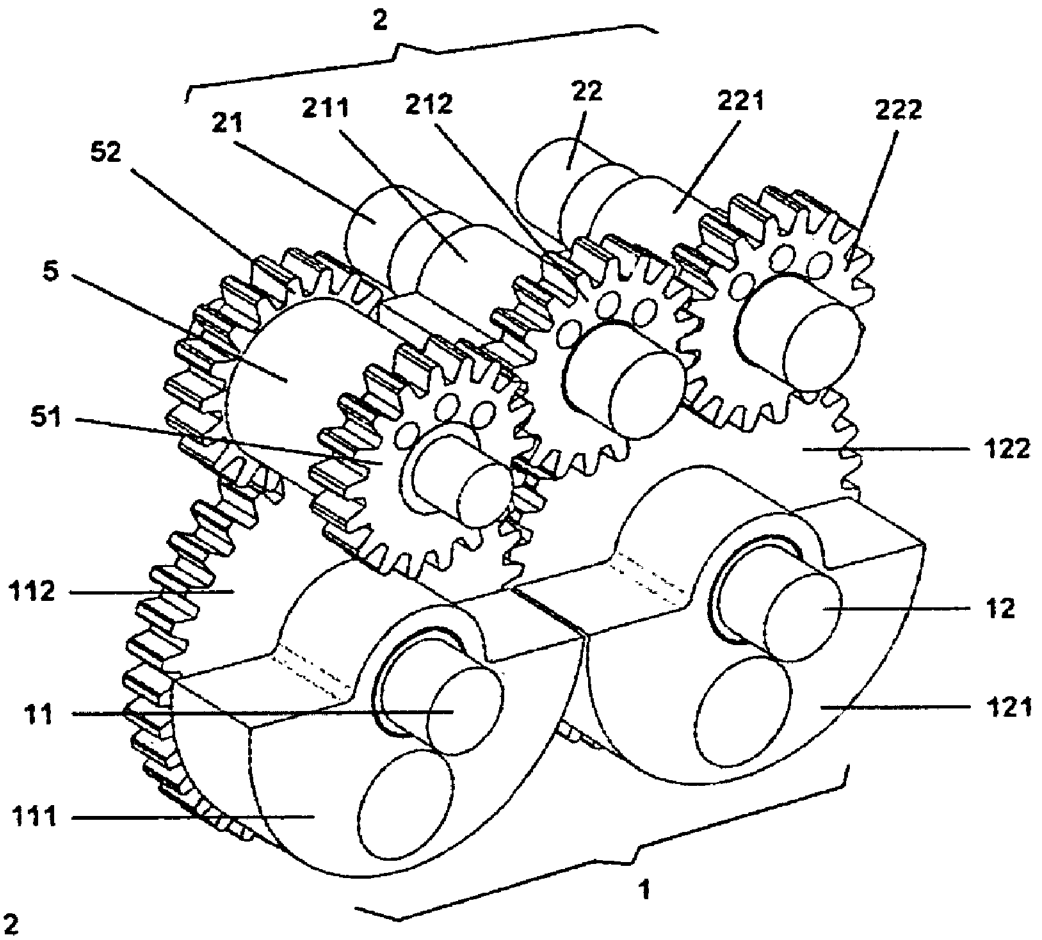
FIG. 2 shows the vibration gear mechanism from FIG. 1, with an additional swivel motor for changing direction.

In the exemplary embodiment according to FIG. 2, a swivel motor 5 is additionally disposed, whose stator has a gear wheel 51 and whose rotor has a gear wheel 52. Shaft groups 1, 2 are connected with one another, by way of swivel motor 5, in such a manner that gear wheel 112 of shaft 11 engages gear wheel 52 of swivel motor 5; gear wheels 212, 222 of shaft group 2 engage gear wheel 51 of swivel motor 5. It is now possible to adjust a phase shift of the vibrations of shaft group 2 relative to the vibrations of shaft group 1 by relative swiveling of the rotor with regard to the stator, thereby making it possible to set a change in direction. In the embodiment shown, swivel motor 5 is a rotary vane motor having one vane.

Figure 3:
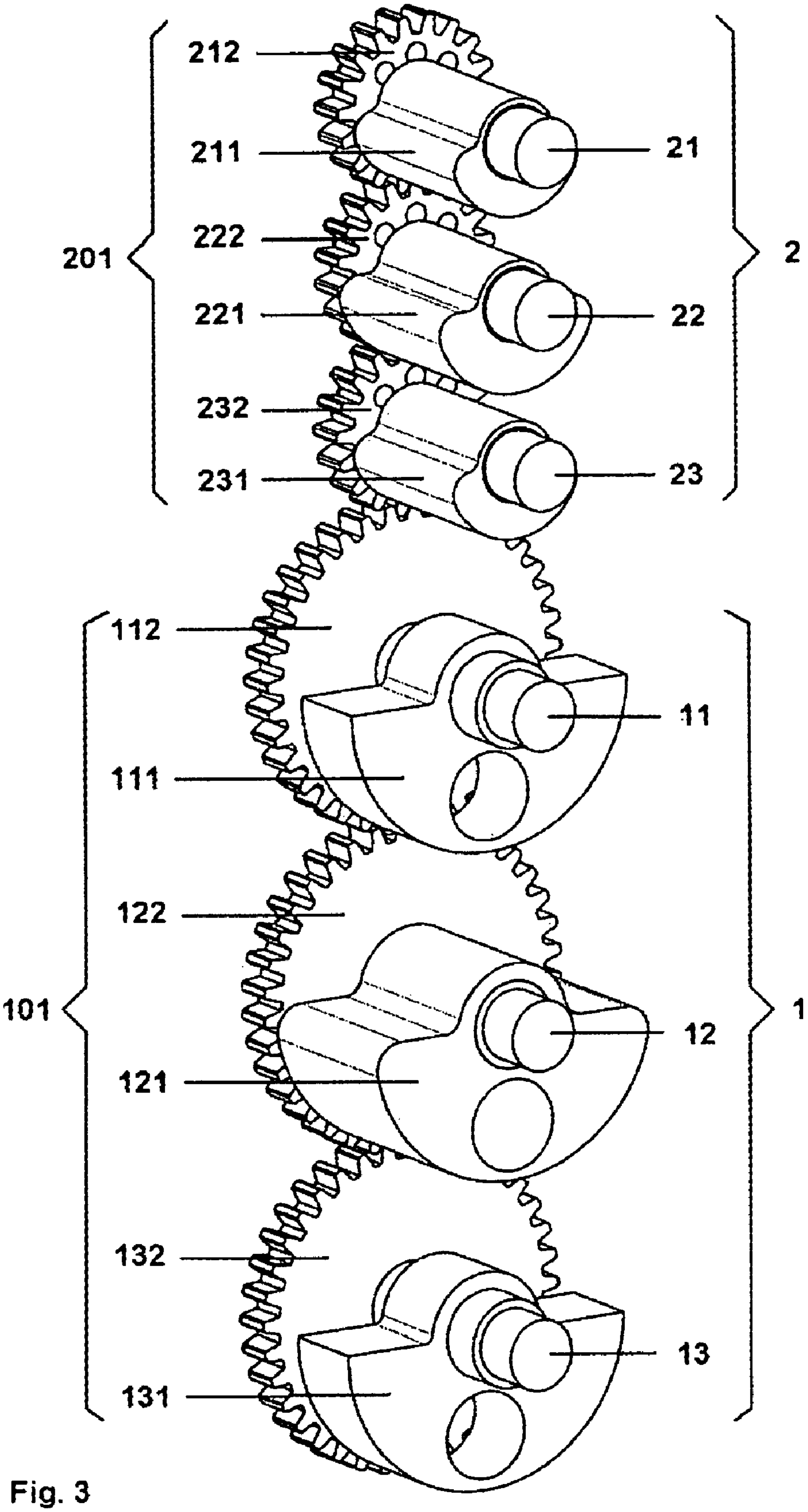
FIG. 3 is a schematic representation of a gear mechanism that acts in a directed manner, having two shaft groups, each consisting of three shafts.
Figure 4:
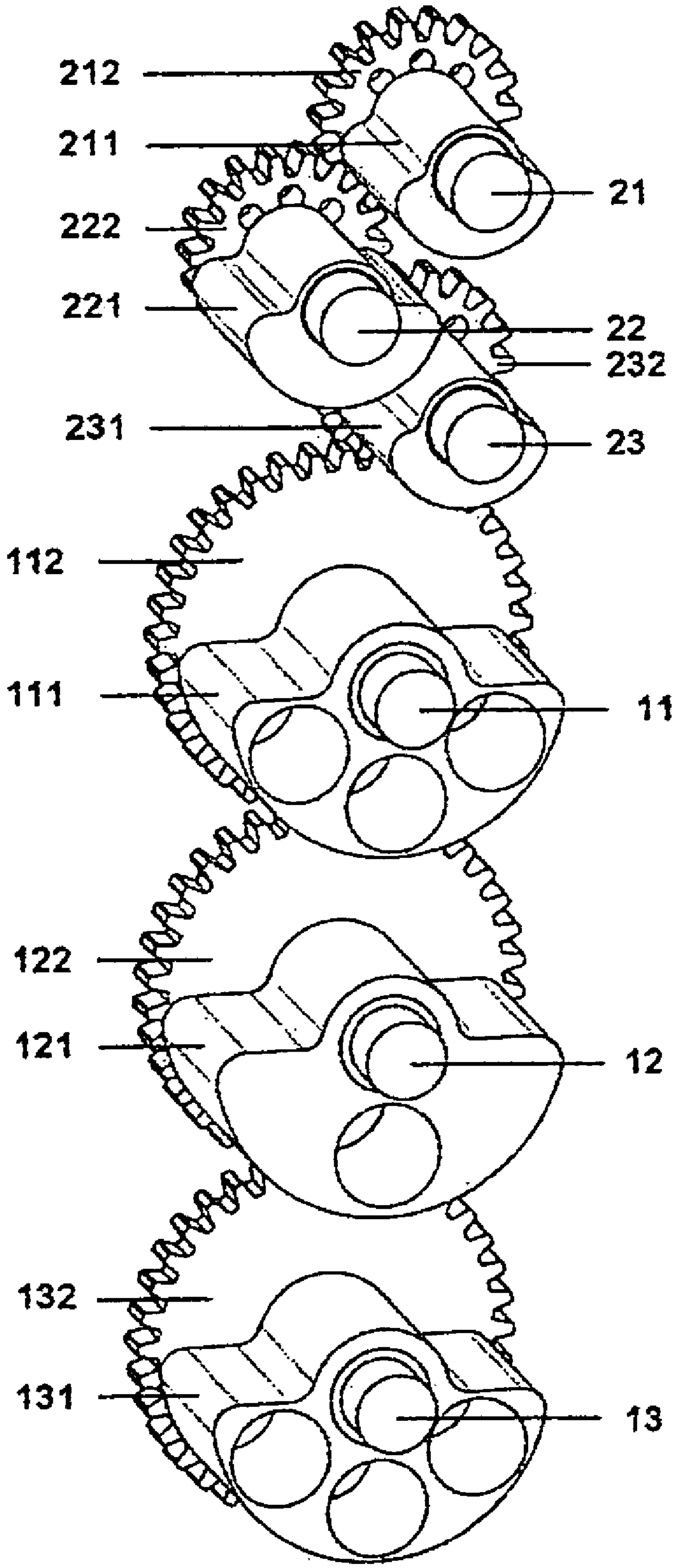
FIG. 4 is a schematic representation of different variants of vibrator gear mechanisms that act in directed manner, having a) a six-shaft, short construction.
Figure 4:
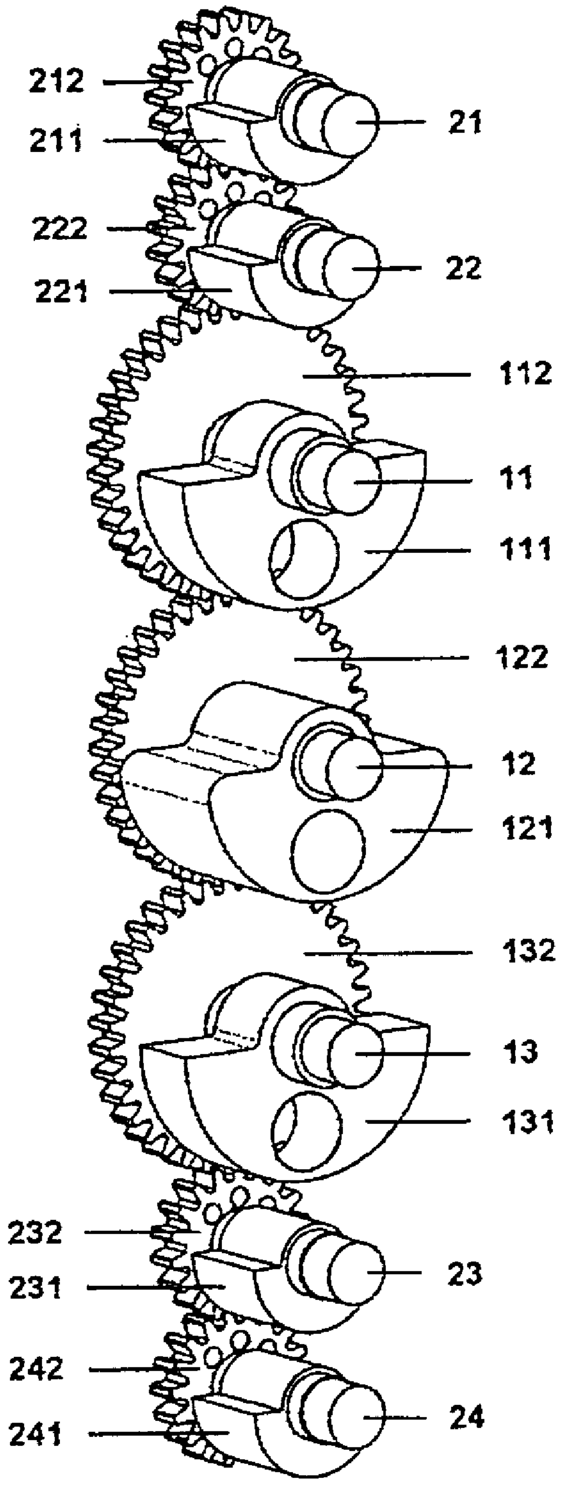
Figure 4:
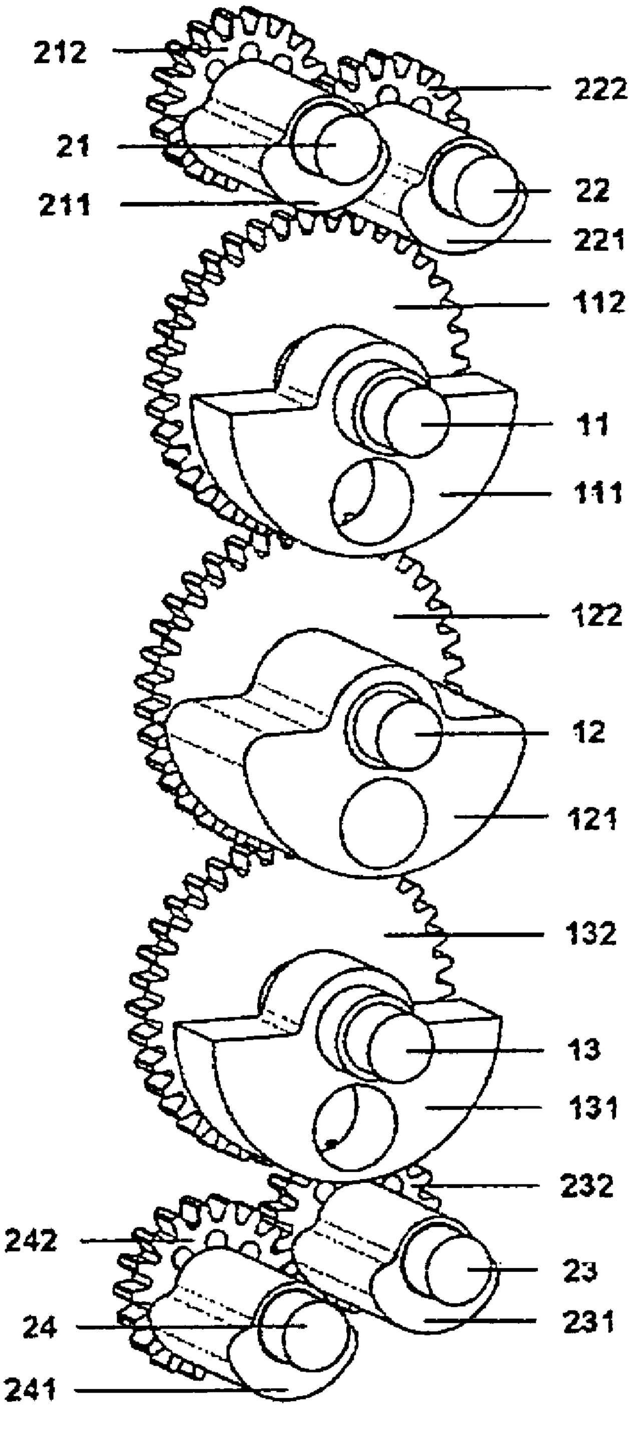

In the embodiment according to FIG. 3, shaft groups 1, 2 are each formed from three shafts 11, 12, 13, 21, 22, 23, respectively, which are each provided with imbalance masses 111, 121, 131, 211, 221, 231, respectively. Imbalance masses 111, 121, and 131 form the imbalance group 101; imbalance masses 211, 221, and 232 form the imbalance group 201. Gear wheels 112, 122, 132, 212, 222, 232 of shafts 11, 12, 13, 21, 22, 23, in turn, are selected in such a manner that during rotation, the shafts of shaft group 2 demonstrate twice the speed of rotation compared to the shafts of shaft group 1. A more compact construction can be achieved by offsetting shafts 21, 22, 23 of shaft group 2 (cf. FIG. 4*a*)). The number of shafts of shaft groups 1, 2 can also be selected to be different. In the embodiment according to FIG. 4*b*), an additional shaft 24 with a corresponding imbalance mass 241 has been added. Again, a compact construction can be achieved by means of an offset arrangement of shafts 21, 22, 23, 24 of the shaft group 2 (cf. FIG. 4*c*)).

In the embodiment according to FIG. 5, a swivel motor 5 is disposed between shafts 11, 12, 13 of the shaft group 1 and shafts 21, 22, 23 of the shaft group 2. Imbalance masses 111, 121, and 131 form imbalance group 101; imbalance masses 211, 221, and 232 form imbalance group 201. In this connection, gear wheels 112, 122, 132 of shaft group 1 engage gear wheel 51 of the stator of swivel motor 5, and gear wheels 212, 222, 231 of shaft group 2 engage gear wheel 52 of the rotor of swivel motor 5. Again, switching of the effect direction is made possible by a relative rotation of stator and rotor of swivel motor 5. Again, a more compact construction height can be achieved by an offset arrangement of the shafts of shaft group 2 (cf. FIG. 5*b*)). In the embodiment shown, swivel motor 5 is a rotary vane motor having three vanes.

In FIG. 6, a modified construction of the aforementioned assembly according to FIG. 5 is shown, which permits a clear reduction in the construction length, but in which eight shafts are required in place of six shafts. This results in less stress on the shaft bearings and brings with it advantages regarding the centripetal force that can be achieved, suitability for high speeds of rotation, and less sensitivity with regard to great angle accelerations.

To achieve the most balanced characteristic line shape possible, an additional speed of rotation stage, whose imbalances rotate at three times the speed of rotation, can be used. In the embodiment according to FIG. 7, such an assembly, based on the gear mechanism concept according to FIG. 5, is shown. This turns out to be slightly wider, since the lower large gear wheel 132, which drives the two shafts 31, 32, which are disposed next to one another, is displaced relative to the center of the gear mechanism. In the adjustment of the effect direction, the angle setting of slow imbalances 111, 121, 131 and fast imbalances 311, 321, relative to one another, remains unchanged. Adjustment of the medium-speed imbalances 211, 221, 231, relative to the others, is made possible by swivel motor 5.

In the embodiment according to FIG. 7, the ratio of the speeds of rotation of shaft groups 1, 2, 3, relative to one another, amounts to approximately 1:2:3; the static moment of shaft groups 1, 2, 3, relative to one another, amounts to essentially 100:16.64:3.68.

Using the aforementioned ratios of the speeds of rotation and the static moments, respectively, relative to one another, a very effective force effect in the forward drive direction can be achieved. This effect can be achieved even with a slight change in the ratio figures in the range of up to ten percent, but some efficiency is lost. These modified ratio figures are also considered to be within the scope of the invention.

Accordingly, while only a few embodiments of the present invention have been shown and described, it is obvious that many changes and modifications may be made thereunto without departing from the spirit and scope of the invention.

What is claimed is:

1. A vibration generator comprising:

three groups of shafts, at least three groups of imbalances disposed on the three groups of shafts;

at least one drive connected to the three groups of shafts, said drive rotating said shafts;

wherein the shaft groups are connected with the at least one drive in such a manner that a speed of rotation of a first shaft group amounts to half of a speed of rotation of a second shaft group and one-third of a speed of rotation of a third shaft group, and wherein a ratio of static moments of the shaft groups provided with the imbalance masses, relative to one another, amounts to essentially 100:16.64:3.68.

* * * * *